E. TECKTONIUS & J. N. BASHAW.
Said BASHAW assignor to said TECKTONIUS.
SEAT SPRING.
No. 10,512. Reissued Aug. 19, 1884.
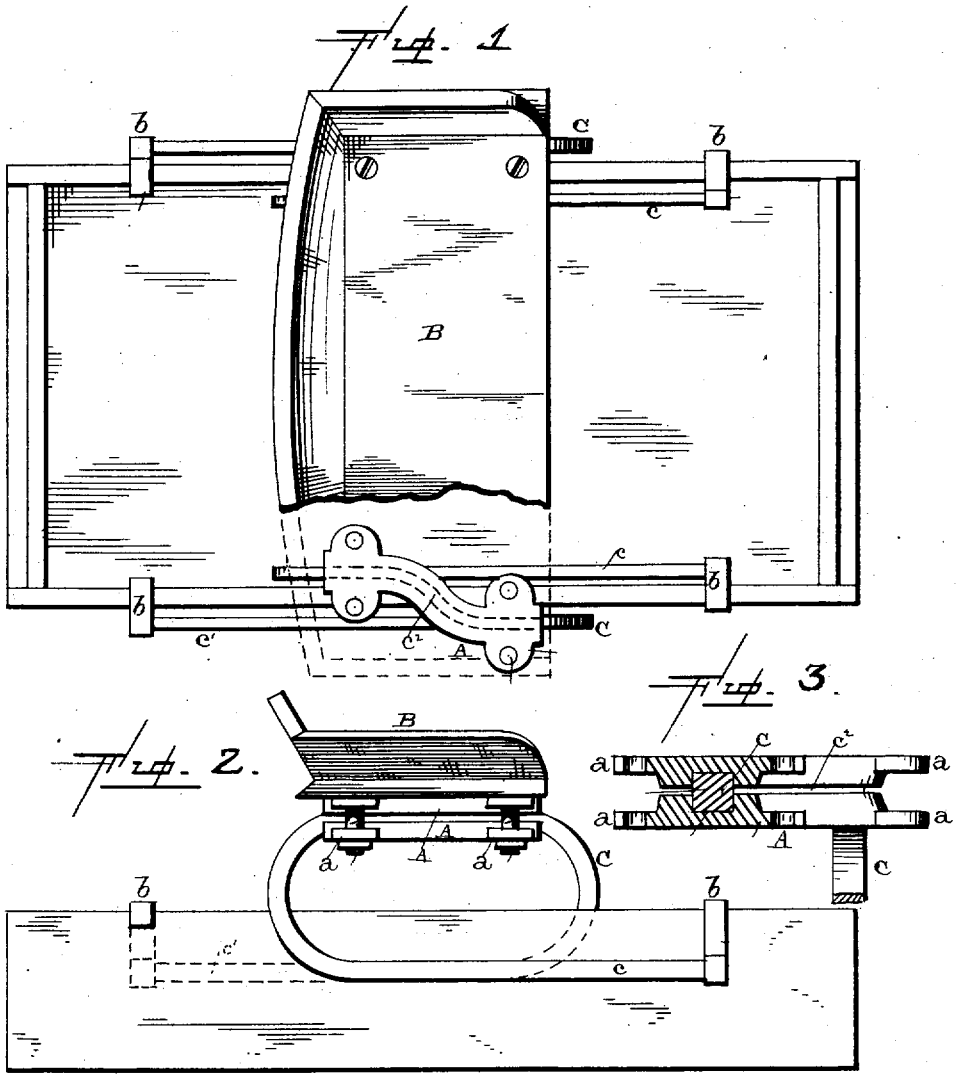
-Witnesses.-
Louis F. Gardner
J. W. Garner
Fig. 4.
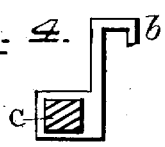
-Inventors.-
E. Tecktonius,
J. N. Bashaw,
per
F. A. Lehmann, atty
N. PETERS, Photo-Lithographer, Washington, D. C.

UNITED STATES PATENT OFFICE.

EMIL TECKTONIUS AND JOHN N. BASHAW, OF KENOSHA, WISCONSIN; SAID BASHAW ASSIGNOR TO SAID TECKTONIUS.

SEAT-SPRING.

SPECIFICATION forming part of Reissued Letters Patent No. 10,512, dated August 19, 1884.

Original No. 262,708, dated August 15, 1882. Application for reissue filed October 9, 1883.

*To all whom it may concern:*

Be it known that we, EMIL TECKTONIUS and JOHN N. BASHAW, citizens of the United States, residing at Kenosha, in the county of Kenosha, in the State of Wisconsin, have invented certain new and useful Improvements in Seat-Springs; and we do declare the following to be a full, clear, and exact description of the invention, such as will enable others skilled in the art to which it appertains to make and use the same, reference being had to accompanying drawings, and to the letters and figures of reference marked thereon, which form a part of this specification, and in which—

Figure 1 is a plan view, with the seat partly broken away, of our improvement in vehicle-spring seats. Fig. 2 is a side view, and Figs. 3 and 4 are detail views, thereof.

This invention has relation to an improvement in vehicle-seat springs; and it consists in the construction of the springs, and of the sockets or brackets composed of two parts suitably bolted together, and adapted to connect the seat to the springs, substantially as hereinafter more fully set forth and claimed.

To put into practice our improvement, we employ two springs, C, which, have the forward horizontally-extending arm, *c*, and a rearwardly-extending similarly-arranged arm, *c'*, disposed out of line with each other. One spring is attached to each end of the seat, and each spring is formed from a single rod or piece of iron, which is given a diagonal bend, $c^2$, at its center, and which has its ends curved or bent so as to extend in opposite directions. The diagonal bend $c^2$ at the center of each spring enables the ends to pass each other and work without interference, so that one will extend outside and the other inside of the vehicle-body. This construction permits the distribution of the weight of the occupant of the seat, and imparts to the spring a greater strength without impairing its resiliency. The ends of the springs are each provided with a hooked-shaped flange, *b*, as shown in Fig. 4, to permit them to be readily and detachably connected to the sides of the vehicle-body.

A A are sockets or brackets to enable the mounting of the seat B upon the springs C. The sockets are made each of two parts or halves, each half consisting of plates grooved or recessed to form as they are brought together an inclosure for the upper part of the spring. They are adapted to conform to, in order to receive, the diagonal bend in the upper portion of the springs, as shown in Fig. 1. The parts or halves of each of the sockets have ears or perforated flanges *a a* at their ends to receive bolts to permit their being bolted to the seat, so as to be readily put together and taken apart, and bolted to or removed from the seat and springs.

This form of spring is adapted for either heavy or farmers' wagons or light vehicles.

We claim and desire to secure by Letters Patent—

1. The spring for vehicle-seats, composed of the two arms, one arranged to extend on the outside and the other on the inside of the vehicle-body, and connected to the seat by a diagonal portion, substantially as and for the purpose set forth.

2. The seat socket or bracket, composed of two parts, each part having a diagonal bend or curved groove, in combination with the spring-bar, substantially as and for the purpose set forth.

3. The single coiled spring, curved at the bottom of the coil to permit one arm to rest on the outside and the other arm on the inside of the box or body of the vehicle, in combination with means for attaching and supporting a seat, as and for the purpose set forth.

4. The single coiled spring, curved, substantially as shown, to permit one arm to rest on the inside and the other arm on the outside of the box or body of the vehicle by means of two hooks, one curved to the right and the other one to the left, as and for the purpose specified.

In testimony whereof we affix our signatures in the presence of two witnesses.

EMIL TECKTONIUS.
JOHN N. BASHAW.

Witnesses:
JOHN B. SIMMONS,
SARAH B. SIMMONS.